(12) United States Patent
Chen et al.

(10) Patent No.: US 10,929,254 B2
(45) Date of Patent: Feb. 23, 2021

(54) DATA PROCESSING SYSTEM PROVIDING SERVICE CONTINUITY PROTECTION

(71) Applicant: CHINA UNIONPAY CO., LTD., Shanghai (CN)

(72) Inventors: Lin Chen, Shanghai (CN); Sen Yang, Shanghai (CN); Junhao Zhang, Shanghai (CN); Xiaoming Zhang, Shanghai (CN); Liwei Xu, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 16/089,807

(22) PCT Filed: Mar. 29, 2017

(86) PCT No.: PCT/CN2017/078545
§ 371 (c)(1),
(2) Date: Sep. 28, 2018

(87) PCT Pub. No.: WO2017/173946
PCT Pub. Date: Oct. 12, 2017

(65) Prior Publication Data
US 2019/0317871 A1    Oct. 17, 2019

(30) Foreign Application Priority Data
Apr. 5, 2016 (CN) .......................... 201610204830.5

(51) Int. Cl.
*G06F 11/20* (2006.01)
*H04L 29/06* (2006.01)
*G06F 3/06* (2006.01)

(52) U.S. Cl.
CPC ...... *G06F 11/2069* (2013.01); *G06F 11/2028* (2013.01); *G06F 11/2035* (2013.01);
(Continued)

(58) Field of Classification Search
CPC ............. G06F 11/2097; G06F 11/2028; G06F 11/203; G06F 11/2046; G06F 11/2023;
(Continued)

(56) References Cited

U.S. PATENT DOCUMENTS

| 2006/0193252 | A1  | 8/2006  | Naseh et al. |
| 2009/0271445 | A1* | 10/2009 | Emaru ............... G06F 11/2069 |
| 2016/0188427 | A1* | 6/2016  | Chandrashekar ... G06F 11/2007 714/4.11 |

* cited by examiner

*Primary Examiner* — Reginald G Bragdon
*Assistant Examiner* — Thanh D Vo
(74) *Attorney, Agent, or Firm* — Anova Law Group, PLLC

(57) ABSTRACT

The present invention relates to a data processing system for providing business continuity protection, comprising: a business center comprising a first data processing unit, a first pre-communication unit, and at least a first post-communication unit; a disaster recovery center comprising a second data processing unit, a second pre-communication unit, and at least a second post-communication unit; wherein the first pre-communication unit and the second pre-communication unit are communicatively coupled to the first post-communication unit respectively when the business center operates normally; the first pre-communication unit and the second pre-communication unit are communicatively coupled to the second post-communication unit respectively when the disaster recovery center operates in place of the business center. The data processing system can reliably switch between the business center and the disaster recovery center, thereby providing a complete protection for the business continuity.

8 Claims, 2 Drawing Sheets

(52) U.S. Cl.
CPC .......... *G06F 11/2082* (2013.01); *H04L 29/06* (2013.01); *G06F 3/0614* (2013.01); *G06F 3/0635* (2013.01); *G06F 3/0683* (2013.01); *G06F 2212/1032* (2013.01)

(58) Field of Classification Search
CPC ............. G06F 11/2025; G06F 11/2007; G06F 11/2033; G06F 11/2094; G06F 11/2048; G06F 11/2069
See application file for complete search history.

DATA PROCESSING SYSTEM PROVIDING SERVICE CONTINUITY PROTECTION

FIELD OF THE INVENTION

The present invention relates to a data processing system for providing business continuity protection.

BACKGROUND OF THE INVENTION

In general, business continuity needs to be taken into account when a data processing system used for processing large-volume data is implemented. Developer will also consider deploying a set of production center (business center) that processes business and a set of disaster recovery center that is not currently processing business but in a standby state, with the application and parameter data of the two centers being substantially synchronized. When the production center is out of order or a center-level switchover is required according to the requirement of switching operations at regular intervals, the business processing function is switched from the production center to the disaster recovery center. Generally, a rough switchover will cause network interruption, and the existing center-level switchover is mainly to determine and/or configure the status of each center regarding core system(s) therein. Specifically, for example, if the disaster recovery center determines that the status of the primary center is in a normal state, the disaster recovery center unconditionally forwards the transaction message sent from the communication unit to the primary center and then the transaction message is processed by the primary center. The above prior art has the following technical defects:

1) Additional network overload: the communication unit is independent of the core system and cannot truly determine the status of each center. Therefore, once the communication unit sends the business data to the disaster recovery center, and the disaster recovery center determines that the status of the primary center is normal, the business data needs to be sent back to the primary center. Similarly, if the communication unit sends the business data to the primary center, and the primary center determines that the status of the primary center is abnormal, but the status of the disaster recovery center is normal, the business data needs to be sent to the disaster recovery center for processing. These processes would all result in additional network overload.

2) Redundant development of the applications for forwarding data between centers: since there may be a possibility of forwarding business data between the disaster recovery center and the production center as described above, a complete set of data (message) forwarding applications are required to realize data (message) forwarding between centers and exception handling, so as to avoid network failure. For example, after the disaster recovery center sends a message to the production center, even if the production center determines that "the primary center is abnormal and the disaster recovery center is normal", the message cannot be forwarded back to the disaster recovery center. Otherwise, an infinite loop may occur. However, the accumulation of a large amount of business data is bound to cause network paralysis.

Accordingly, those skilled in the art desire to obtain a data processing system that can reliably switch between a business center and a disaster recovery center to provide business continuity protection.

SUMMARY OF THE INVENTION

It is an object of the present invention to provide a data processing system that provides business continuity protection.

In order to achieve the above object, the present invention provides a technical solution as follows:

A data processing system for providing business continuity protection, comprising: a business center, comprising: a first data processing unit configured to process various business data; a first pre-communication unit configured to perform data communication with an external unit via a network; and at least a first post-communication unit communicatively coupled to the first data processing unit and communicatively coupled to the first pre-communication unit in a configurable manner, the first post-communication unit is configured to shield the first data processing unit from direct impact of external data and/or network status; and a disaster recovery center configured to be in a standby state when the business center operates normally and to operate in place of the business center when the business center is out of order, the disaster recovery center comprising: a second data processing unit configured to process business data when the disaster recovery center operates; a second pre-communication unit configured to perform data communication with the external unit via a network; and at least a second post-communication unit communicatively coupled to the second data processing unit and communicatively coupled to the second pre-communication unit in a configurable manner, the second post-communication unit is configured to shield the second data processing unit from direct impact of external data and/or network status; wherein the first pre-communication unit and the second pre-communication unit are communicatively coupled to the first post-communication unit respectively when the business center operates normally; and wherein the first pre-communication unit and the second pre-communication unit are communicatively coupled to the second post-communication unit respectively when the disaster recovery center operates in place of the business center.

Optionally, the first pre-communication unit and the second pre-communication unit are communicatively disconnected from the second post-communication unit when the business center operates normally; and the first pre-communication unit and the second pre-communication unit are communicatively disconnected from the first post-communication unit when the disaster recovery center operates in place of the business center.

Optionally, the data processing system further comprises a parameter database, wherein the first pre-communication unit and the second pre-communication unit are synchronized to the parameter database respectively using data synchronization technology so as to obtain configuration parameters for the first pre-communication unit and the second pre-communication unit.

Optionally, the business center comprises a plurality of the first post-communication units, the first pre-communication unit comprises a link managed sub-module, wherein the link managed sub-module is configured to establish a communication link between each of the external counterparts and the first pre-communication unit respectively, and establish a communication link between the first pre-communication unit and each of the first post-communication units respectively.

Optionally, the data processing system further comprises a switchover console, the switchover console is configured to be communicatively coupled to the first pre-communication unit and the second pre-communication unit, respectively, wherein the switchover console generates a switchover instruction for enabling the data processing system to switch between the following two states: a first state in which the business center operates normally; and a second state in which the disaster recovery center operates in place of the business center.

The data processing system provided by the embodiments of the present invention can reliably switch between the business center and the disaster recovery center, thereby providing a complete protection for the business continuity. In addition, the data processing system can avoid network overload, reduce costs for development, operation and maintenance, and achieve a prompt switchover of the operating states thereof.

DETAILED DESCRIPTION OF THE INVENTION

It should be noted that the term "communicatively coupled in a configurable manner" in the present invention means that a physically connected line is maintained between two ends, and the communication connection between the two can be enabled or disabled, wherein the term "enable communication connection" or "communicatively coupled" means that data can be transmitted between the two.

Figure 1:
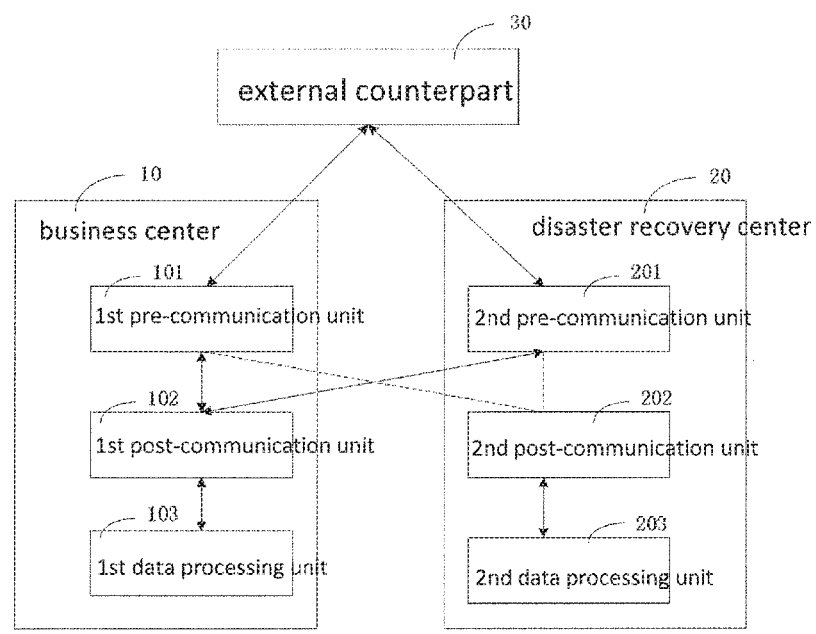
FIG. 1 is a block diagram showing a data processing system when the business center operates normally according to an embodiment of the invention.

As shown in FIG. 1, a first embodiment of the present invention provides a data processing system, which includes a business center 10 and a disaster recovery center 20, wherein the business center 10 operates normally.

The business center 10 includes a first pre-communication unit 101, a first post-communication unit 102, and a first data processing unit 103. The first data processing unit 103 is configured to process various business data to implement various business functions of the business center 10. The first pre-communication unit 101 performs data communication with external counterparts 30 via a network. The first post communication unit 102 is communicatively coupled to the first data processing unit 103 and is communicatively coupled to the first pre-communication unit 101 in a configurable manner, the first post communication unit 102 is further configured to shield the first data processing unit 103 from direct impact of external data and/or network status.

Similarly, the disaster recovery center 20 includes a second pre-communication unit 201, a second post-communication unit 202, and a second data processing unit 203. The second data processing unit 203 is configured to process various business data to implement various business functions of the disaster recovery center 20. The second pre-communication unit 201 performs data communication with external counterparts 30 via a network. The second post-communication unit 202 is communicatively coupled to the second data processing unit 203 and is communicatively coupled to the second pre-communication unit 201 in a configurable manner, the second post-communication unit 202 is further configured to shield the second data processing unit 203 from direct impact of external data and/or network status.

Wherein, the first pre-communication unit 101 can determine or record the health condition of the business center 10, and the second pre-communication unit 201 can determine or record the health condition of the disaster recovery center 20.

With continued reference to FIG. 1, specifically, when the business center 10 operates normally, the disaster recovery center 20 is in a standby state and does not participate in business processing. The first pre-communication unit 101 and the second pre-communication unit 201 are both communicatively coupled to the first post-communication unit 102. Upon receipt of external data, the external data is forwarded to the first post-communication unit 102, and then forwarded by the first post-communication unit 102 to the first data processing unit 103 for being processed, so as to implement the normal business function of the business center 10.

At the same time, physically connected lines are maintained between the first pre-communication unit 101 and the second post-communication unit 202, and between the second pre-communication unit 201 and the second post-communication unit 202. In this manner, when the business center 10 is out of order or a communication failure occurs between the first pre-communication unit 101 and the external counterparts 30, data communication may be enabled between the first pre-communication unit 101 and the second post-communication unit 202, and between the second pre-communication unit 201 and the second post-communication unit 202, thereby enabling the disaster recovery center 20 to operate in place of the business center 10 to achieve business continuity.

According to a further improvement of the above embodiment, when the business center 10 operates normally, the communication connection between the first pre-communication unit 101 and the second post-communication unit 202 and the communication connection between the second pre-communication unit 201 and the second post-communication unit 202 are disabled, but the physically connected lines are still maintained. This improvement can effectively prevent data or messages from being transmitted to the second post-communication unit 202 and the second data processing unit 203 and consequent forwarding of data or messages, which is unnecessary, thereby contributing to saving network resource.

In order to ensure the reliability and anti-interference of data communication, according to the first embodiment as mentioned above, the first pre-communication unit 101 and the second pre-communication unit 201 establish a communication link to perform data communication with each of the external counterparts 30 respectively. Similarly, the first pre-communication unit 101 and the second pre-communication unit 201 establish a communication link to perform data communication with the first post-communication unit 102 respectively.

Further, when the first pre-communication unit 101 of the business center 10 receives data from the plurality of external counterparts 30, the first pre-communication unit 101 will allocate to each of the communication links between the first pre-communication unit 101 and the external counterparts 30 a buffer for storing valid business data received from each of the corresponding external counterparts 30, thereby forming a plurality of business queues, each of the queues corresponding to the respective one of the communication links. The first post-communication unit 102, following business rules, extracts from each business queue valid business data and submits it to the first data processing unit 103 for business processing. In this process, the first pre-communication unit 101 and the first post-communication unit 102 can perform pre-processing on the valid business data respectively to improve the data processing efficiency of the business center 10. This buffer can be used to buffer the data in a valid range. Even if a line interruption occurs for the second post-communication unit or a center-level switchover occurs, data in the valid period can be keeled safe without loss and the business continuity is guaranteed (the data beyond the valid period is meaningless).

In addition, a plurality of first post-communication units 102 (only one is illustrated in the figure for the sake of simplicity) may be configured to be within the business center 10 to perform parallel processing for a plurality of business queues. It can be understood that the above configurations can be applied to the second pre-communication unit 201 and the second post-communication unit 202 as well.

Preferably, the first pre-communication unit 101 includes a link managed sub-module (not shown in the drawing) that establishes a communication link between each of the external counterparts 30 and the first pre-communication unit 101, and a communication link between the first pre-communication unit and each of the first post-communication units 102, to implement a 1-to-N communication function of the network link. When a center-level switchover is required (for example, switching from the business center 10 to the disaster recovery center 20), all the pre-communication units (first and second) firstly establish a connection with the second post-communication units of the disaster recovery center 20 through the managed sub-module, secondly update the parameters in the second pre-communication unit 201, and finally disconnect the connection with the first post-communication unit of the business center 10 (disconnecting is not essential, but it is preferable to perform cleanup work including cleaning up network connection information, cache information and the like when switched or restored from the disaster recovery center 20, and at this time, disconnecting is preferred).

In order that the disaster recovery center 20 can reliably replace the business center 10 to operate when the business center 10 is out of order, it is necessary to make the first pre-communication unit 101 and the second pre-communication unit 201 adopt the same or similar configuration parameters. In contrast, the data processing system can also provide a parameter database, and the first pre-communication unit 101 and the second pre-communication unit 201 are respectively synchronized to the parameter database using data synchronization technology to obtain the same or similar configuration parameters.

Figure 2:
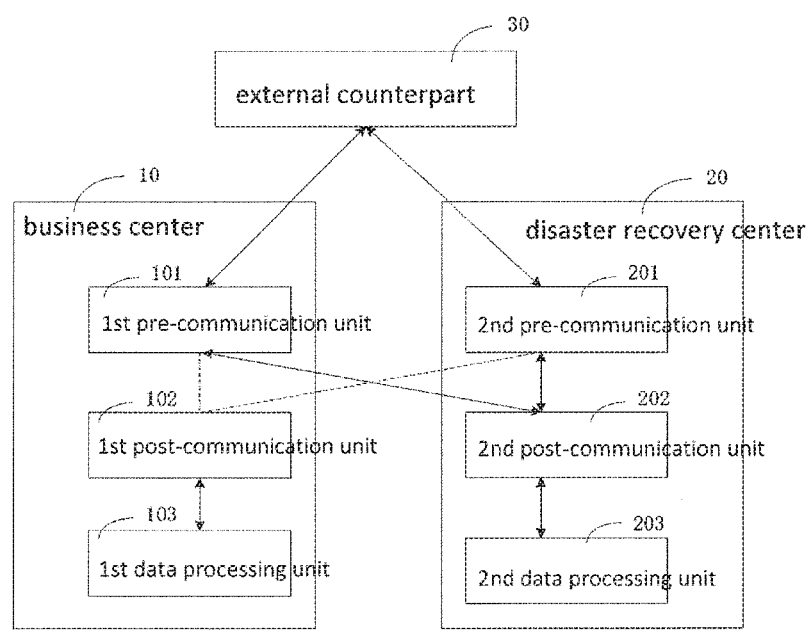
FIG. 2 is a block diagram showing a data processing system when a disaster recovery center operates in place of a business center according to an embodiment of the invention.

As shown in FIG. 2, a data processing system provided by the second embodiment of the present invention similarly includes a business center 10 and a disaster recovery center 20, wherein the disaster recovery center 20 operates in place of the business center 10 when the business center 10 is out of order.

The business center 10 includes a first pre-communication unit 101, a first post-communication unit 102, and a first data processing unit 103. The disaster recovery center 20 includes a second pre-communication unit 201 and a second post-communication unit 202, and the second data processing unit 203. The functions of each of the units and the connection relationships between each other can be similar to those in the first embodiment.

The difference is that, in the case that the disaster recovery center 20 operates in place of the business center 10 as shown in FIG. 2, the first pre-communication unit 101 and the second pre-communication unit 201 are both communicatively coupled to the second post-communication unit 202. Upon receipt of external data, the external data is forwarded to the second post-communication unit 202, and then forwarded by the second post-processing unit 202 to the second data processing unit 203 for being processed, thereby enabling the disaster recovery center 20 to implement the business function of the business center 10.

At the same time, physically connected lines are maintained between the first pre-communication unit 101 and the first post-communication unit 102, as well as between the second pre-communication unit 201 and the first post-communication unit 102. In this manner, when the business center 10 returns to normal or when maintenance needs to be performed on the disaster recovery center 20, data communication can be enabled between the first pre-communication unit 101 and the first post-communication unit 102, as well as between the second pre-communication unit 201 and the first post-communication unit 102, thereby enabling the business center 10 to resume operation and the disaster recovery center 20 to stop operating to meet business continuity requirements.

Further, when the disaster recovery center 20 operates in place of the business center 10, the first pre-communication unit 101 and the second pre-communication unit 201 both disconnect the communication connections from the first post-communication unit 102, but still maintain the physically connected lines therebetween. This improvement can avoid unnecessary data/message delivery, saving network resource.

During communication, the first pre-communication unit 101 and the second pre-communication unit 201 each establishes a communication link to perform data communication with the second post-communication unit 202, respectively, by using TCP protocol.

Optionally, there are a plurality of second post-communication units 202. The second pre-communication unit 201 includes a link managed sub-module (not shown in the drawing) that establishes a communication link between each of the external counterparts 30 and the second pre-communication unit 201, as well as a communication link between the second pre-communication unit 201 and each of the second post-communication units 202. The link managed sub-module may be configured for managing only the communication links, and the second pre-communication unit 201 and the second post-communication unit 202 can focus on performing some of the pre-processing operations on the business data.

Figure 3:
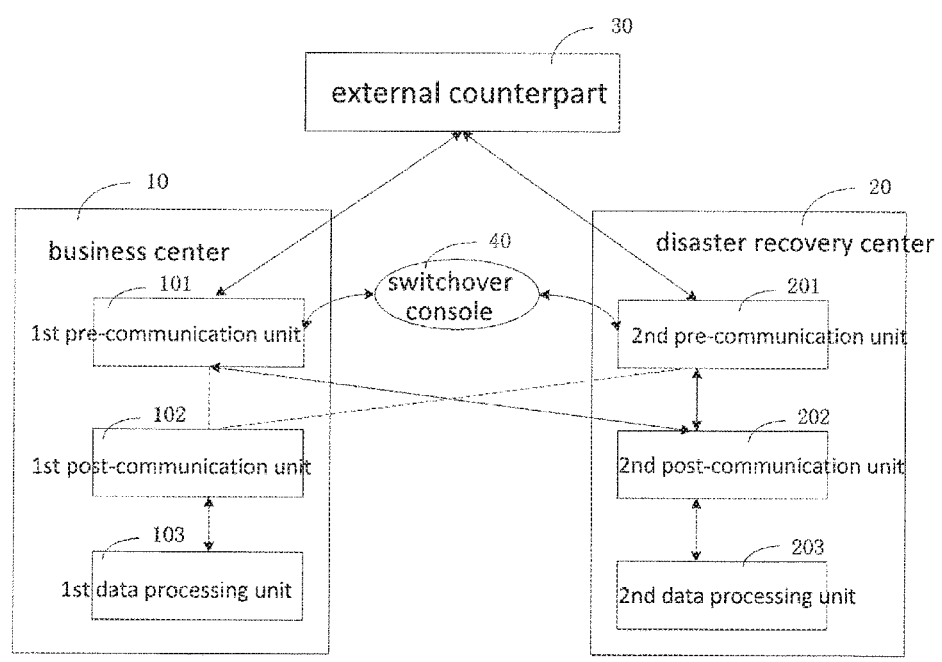
FIG. 3 is a block diagram of a data processing system including a switchover console.

As a further improved embodiment of the above first and second embodiments, the data processing system may further include a switchover console 40. As shown in FIG. 3, the switchover console is communicatively coupled to the first pre-communication unit 101 and the second pre-communication unit 201, respectively. According to the operations or interactions of a user, the switchover console 40 can generate a switchover instruction, so that the data processing system switches between two or more operating states. At least two operating states are included as follows: a first state in which the business center 10 operates normally; and a second state in which the disaster recovery center 20 operates in place of the business center 10.

Accordingly, the first pre-communication unit 101 and the second pre-communication unit 201 are provided with a management interception sub-module, respectively, for intercepting the switchover instruction from the switchover console 40.

For example, the switchover console 40 issues an instruction, instructing the data processing system to switch from the first state to the second state. In this case, after the first pre-communication unit 101 intercepts the above instruction, it will start to establish a communication connection with the second post-communication unit 202, update the configuration parameters of the first pre-communication unit 101, and disconnect the communication connection with the first post-communication unit 102.

The data processing systems provided by the foregoing embodiments of the present invention can reliably switch between the business center and the disaster recovery center, and further have the following advantages:

1) Mitigating the impact of network interruptions or failures between the system and the external counterparts on business continuity;

2) Avoiding the unwanted network overload: The first or second pre-communication unit can directly locate the center that is actually performing business processing (whether it is the business center or the disaster recovery center), thereby avoiding unnecessary forwarding of data/message between the centers, saving network resource;

3) Reducing development costs: effectively avoiding the unnecessary forwarding of data/messages between centers, and thus avoiding needs for applications that should have been developed to cope with complex forwarding mechanisms, thereby reducing costs for development, daily operation, maintenance and inspection, and making full use of system resources and database resources;

4) Providing instant switch by introducing a switchover console for regions and projects having controlled funds, low network bandwidth, low transaction volume, and inexperienced technicians, to enable the data processing system quickly switch between two or more operating states.

The above description is only for the preferred embodiments of the present invention and is not intended to limit the scope of protection of the present invention. Various modifications may be made by those skilled in the art without departing from the spirit of the invention and the appended claims.

What is claimed is:

1. A data processing system for providing business continuity protection for external counterparts, comprising:
   a business center, comprising:
      a first data processing unit, configured to process various business data;
      a first pre-communication unit, configured to perform data communication with an external unit via a network; and
      at least a first post-communication unit, communicatively coupled to the first data processing unit and communicatively coupled to the first pre-communication unit in a configurable manner, wherein the first post-communication unit is configured to shield the first data processing unit from direct impact of external data and/or network status; and
   a disaster recovery center, configured to be in a standby state when the business center operates normally, and to operate in place of the business center when the business center is out of order, wherein the disaster recovery center comprises:
      a second data processing unit, configured to process business data when the disaster recovery center operates;
      a second pre-communication unit, configured to perform data communication with the external unit via a network; and
      at least a second post-communication unit, communicatively coupled to the second data processing unit and communicatively coupled to the second pre-communication unit in a configurable manner, wherein the second post-communication unit is configured to shield the second data processing unit from direct impact of external data and/or network status;
   wherein the first pre-communication unit and the second pre-communication unit are communicatively coupled to the first post-communication unit respectively when the business center operates normally, and physically connected lines between the first pre-communication unit and the second post-communication unit and communication connection between the second pre-communication unit and the second post-communication unit are maintained, while communication connection between the first pre-communication unit and the second post-communication unit and communication connection between the second pre-communication unit and the second post-communication unit are disabled, so as to prevent data from being transmitted to the second post-communication unit; and
   wherein the first pre-communication unit and the second pre-communication unit are communicatively coupled to the second post-communication unit respectively when the disaster recovery center operates in place of the business center.

2. The data processing system according to claim 1, wherein the first pre-communication unit and the second pre-communication unit are communicatively disconnected from the first post-communication unit when the disaster recovery center operates in place of the business center.

3. The data processing system according to claim 1, further comprising a parameter database, wherein the first pre-communication unit and the second pre-communication unit are synchronized to the parameter database respectively using data synchronization technology so as to obtain configuration parameters for the first pre-communication unit and the second pre-communication unit.

4. The data processing system according to claim 1, wherein the first pre-communication unit and the second pre-communication unit are configured to perform data communication with the external counterparts through communication links, respectively.

5. The data processing system according to claim 4, wherein the first pre-communication unit and the second pre-communication unit perform data communication with the first post-communication unit or the second post-communication unit through communication links, respectively.

6. The data processing system according to claim 4, wherein the business center comprises a plurality of the first post-communication units, the first pre-communication unit comprises a link managed sub-module, wherein the link managed sub-module is configured to establish a communication link between each of the external counterparts and the first pre-communication unit respectively, and establish a communication link between the first pre-communication unit and each of the first post-communication units respectively.

7. The data processing system according to claim 5, wherein the first pre-communication unit is configured to allocate for each of the communication links between the first pre-communication unit and the external counterparts a buffer for storing valid business data received from the respective external counterpart.

8. The data processing system according to any of claims 1 to 7, wherein the data processing system further comprises a switchover console, the switchover console is configured to be communicatively coupled to the first pre-communication unit and the second pre-communication unit, respectively, wherein the switchover console generates a switchover instruction for enabling the data processing system to switch between the following two states:
- a first state in which the business center operates normally; and
- a second state in which the disaster recovery center operates in place of the business center.

* * * * *